US010766453B2

(12) United States Patent
Beyer et al.

(10) Patent No.: US 10,766,453 B2
(45) Date of Patent: Sep. 8, 2020

(54) APPARATUS, KEY REMOTE, AND METHOD FOR CONTROLLING OPERATING CONDITIONS OF A KEY MODULE (71) Applicant: VOLKSWAGEN AG, Wolfsburg (DE)

(72) Inventors: Karsten Beyer, Berlin (DE); Christoph Fricke, Braunschweig (DE); Peter Lohmann, Rhede (DE); Dominique Nemetschek, Velpke (DE); Andreas Thiele, Wolfsburg (DE); Julian Verkin, Hennigsdorf (DE)

(73) Assignee: Volkswagen AG, Wolfsburg (DE)

( * ) Notice: Subject to any disclaimer, the term of this patent is extended or adjusted under 35 U.S.C. 154(b) by 176 days.

(21) Appl. No.: 15/875,131

(22) Filed: Jan. 19, 2018

(65) Prior Publication Data
US 2018/0208155 A1    Jul. 26, 2018

(30) Foreign Application Priority Data

Jan. 24, 2017  (DE) .................. 10 2017 201 087

(51) Int. Cl.
    B60R 25/045     (2013.01)
    B60R 25/24      (2013.01)
    (Continued)

(52) U.S. Cl.
    CPC .......... B60R 25/045 (2013.01); B60R 25/245 (2013.01); B60R 25/248 (2013.01);
    (Continued)

(58) Field of Classification Search
    CPC ..... B60R 25/045; B60R 25/31; B60R 25/248; B60R 25/245; H04W 4/80; H04W 12/12; H04L 2209/84; H04L 2209/80
    See application file for complete search history.

(56) References Cited

U.S. PATENT DOCUMENTS 5,670,831 A * 9/1997 Georgiades ............. B60R 25/04
                                                      180/287
5,751,950 A * 5/1998 Crisan .................... G06F 21/57
                                                      713/310
(Continued)

FOREIGN PATENT DOCUMENTS

DE        19937915 A1    3/2000
DE        19927253 A1    1/2001
(Continued)

OTHER PUBLICATIONS

Search Report for German Patent Application No. 10 2017 201 087.8; dated Aug. 18, 2017.

Primary Examiner — Pinping Sun
(74) Attorney, Agent, or Firm — Barnes & Thornburg LLP (57) ABSTRACT An apparatus, a key partner, methods and computer programs for a key module of a vehicle and a vehicle. The apparatus for the key module includes a communication interface for radio communication with a key partner of the vehicle, a motion sensor, and a control module for controlling an operating state from operating states of the key module based on the information about the motion of the key module. The operating states include at least a first operating state, a pre-shutdown operating state and a shutdown state. The control module activates the first operating state if the motion of the key module is above a motion limit value and activates the pre-shutdown operating state if the motion of the key module is below the motion limit value over a period of time.

11 Claims, 4 Drawing Sheets (51) Int. Cl.
*B60R 25/31* (2013.01)
*H04W 4/80* (2018.01)
*H04W 12/12* (2009.01)

(52) U.S. Cl.
CPC .......... *B60R 25/31* (2013.01); *H04L 2209/80* (2013.01); *H04L 2209/84* (2013.01); *H04W 4/80* (2018.02); *H04W 12/12* (2013.01)

(56) References Cited

U.S. PATENT DOCUMENTS

| | | | | |
|---|---|---|---|---|
| 5,831,520 | A * | 11/1998 | Stephan | B60R 25/225 340/457 |
| 7,446,644 | B2 * | 11/2008 | Schaffzin | G07C 9/00182 340/5.6 |
| 8,392,735 | B2 * | 3/2013 | Mucignat | G06F 1/3203 713/323 |
| 8,841,987 | B1 * | 9/2014 | Stanfield | G07C 9/00857 340/5.61 |
| 9,002,540 | B2 * | 4/2015 | Ledendecker | G07C 9/00944 340/426.36 |
| 9,235,940 | B2 * | 1/2016 | Iwanaga | H02J 7/025 |
| 9,763,097 | B2 * | 9/2017 | Robinson | H04W 12/08 |
| 2009/0177336 | A1 * | 7/2009 | McClellan | B60R 25/2018 701/2 |
| 2010/0223180 | A1 * | 9/2010 | Kremen | G06Q 10/10 705/40 |
| 2010/0238033 | A1 * | 9/2010 | Blumel | A61B 5/1112 340/573.4 |
| 2012/0041618 | A1 * | 2/2012 | Sun | G01C 21/362 701/2 |
| 2012/0116605 | A1 * | 5/2012 | Seymour | B60R 25/243 701/1 |
| 2017/0021803 | A1 * | 1/2017 | Lohmann | G07C 9/00896 |
| 2017/0372546 | A1 * | 12/2017 | Haruna | G06F 21/44 |
| 2018/0297558 | A1 * | 10/2018 | Froitzheim | B60R 25/209 |
| 2018/0334138 | A1 * | 11/2018 | Namineni | H04W 12/0403 |
| 2018/0349656 | A1 * | 12/2018 | Lee | G06K 7/10366 |

FOREIGN PATENT DOCUMENTS

| | | | | |
|---|---|---|---|---|
| DE | 102011116209 A1 * | 4/2012 | | B60R 25/24 |
| DE | 102011013605 A1 | 9/2012 | | |
| DE | 102011050160 A1 * | 11/2012 | | B60R 25/24 |
| DE | 102011050160 A1 | 11/2012 | | |
| DE | 102011116157 A1 | 4/2013 | | |
| DE | 102011088917 A1 | 6/2013 | | |
| EP | 2548748 A2 * | 1/2013 | | B60C 23/0418 |

* cited by examiner

APPARATUS, KEY REMOTE, AND METHOD FOR CONTROLLING OPERATING CONDITIONS OF A KEY MODULE

PRIORITY CLAIM

This patent application claims priority to German Patent Application No. 10 2017 201 087.8, filed 24 Jan. 2017, the disclosure of which is incorporated herein by reference in its entirety.

SUMMARY

Illustrative embodiments relate to an apparatus, a key partner, methods and computer programs for a key module of a vehicle and to a vehicle, more specifically, but not exclusively, to an apparatus, a key partner, methods and computer programs for controlling operating states of the key module.

BRIEF DESCRIPTION OF THE DRAWINGS

Disclosed embodiments are described in more detail below on the basis of the drawings, to which, however, exemplary embodiments generally are not restricted overall. In the drawings.

DETAILED DESCRIPTION

Security for entry and driving authorization for a vehicle usually takes up a central position. Often, a high level of effort is made to prevent unauthorized entry to a vehicle. The same applies to driving authorization. Vehicle keys often comprise ingenious security systems to prevent or hamper copying of the keys or entry to the vehicle or mobility thereof without a valid key. These security systems may be based on a transponder, for example, that is activated by a magnetic field of an engine immobilizer system and that could transmit an electronic entry key to the vehicle.

In addition to conventional entry systems, vehicle keys are being developed that can allow entry to the vehicle without transmission of a key being explicitly activated by a user (what is known as keyless entry) or can allow starting of the vehicle without introduction of the vehicle key into an ignition lock of the vehicle (what is known as keyless go).

There is a need for an improved design for a security system of a vehicle. This need is met by the independent claims.

Exemplary embodiments provide an apparatus, methods and computer programs for a key module and a key partner of a vehicle. The key module knows multiple operating states: an active (first) operating state, a pre-shutdown state and a shutdown state. If the key detects no motion for long, then it is configured to change to the pre-shutdown state. In the pre-shutdown state, the key module is configured to make a shutdown request to the key partner. If the key partner affirms shutdown, then the key module can change to the shutdown state.

Exemplary embodiments provide an apparatus for a key module for a vehicle. The apparatus comprises a communication interface, configured for radio communication with a key partner of the vehicle. The apparatus further comprises a motion sensor, configured for determining information about a motion of the key module. The apparatus further comprises a control module, configured for controlling the communication interface and the motion sensor. The control module is configured for controlling an operating state from a plurality of operating states of the key module based on the information about the motion of the key module. The plurality of operating states comprises at least a first operating state, a pre-shutdown operating state and a shutdown state. The control module is configured for controlling the operating state by activating the first operating state if the motion of the key module is above a motion limit value. The control module is configured for controlling the operating state by activating the pre-shutdown operating state if the motion of the key module is below the motion limit value over a period of time. The control module is configured for transmitting a shutdown request via the communication interface for the key partner of the vehicle if the key module is in the pre-shutdown operating state. The control module is configured for controlling the operating state by shutting down the key module if a response of the key partner of the vehicle to the shutdown request indicates an authorization for the shutdown of the key module and the key module continues to be in the pre-shutdown operating state.

Shutting down the key module allows relay attacks on the communication between key module and key partner to be hampered and increased security of the security system to be achieved, for example. Transmitting the shutdown request and activating the shutdown state of the key module if the key partner authorizes shutdown allows shutdown of the key module to be implemented without impairment of convenience arising after breaks in driving in which the key remains in the vehicle.

By way of example, the plurality of operating states can further comprise a second operating state. The control module may be configured to activate the second operating state if the motion of the key module is below the motion limit value over a further period of time. The control module may be configured to activate the pre-shutdown operating state if the motion of the key module is below the motion limit value and below a further motion limit value of the period of time and the key module is in the second operating state. In some exemplary embodiments, the second operating state permits finer granularity for the transitions between operating states.

By way of example, the plurality of operating states can further comprise one or more intermediate operating states between the second operating state and the pre-shutdown operating state, for example, a third operating state and a fourth operating state. The one or more intermediate operating states can be passed through in the event of a change from the second operating state to the pre-shutdown operating state, which can allow further-increased granularity. By way of example, the control module may be configured to pass through the one or more intermediate operating states in the event of a transition between the second operating state and the pre-shutdown operating state. By way of example, motion limit values of the intermediate operating states can permit a lower intensity of motion than motion limit values of the first operating state and/or of the second operating state. By way of example, transitions to or from the one or more intermediate operating states may be implemented similarly to the transitions to or from the second operating state.

By way of example, the control module may be configured to activate the second operating state if the motion of the key module is below the motion limit value over the further period of time and the key module is in the first operating state. The control module may be configured to activate the first operating state, from the shutdown state or the pre-shutdown state, if the motion of the key module is above the motion limit value and to activate the second operating state if the motion of the key module is between the motion limit value and the further motion limit value. By way of example, the motion limit value can permit a higher intensity of motion than the further motion limit value.

By way of example, the control module may be configured to activate the first operating state if the motion of the key module is above the motion limit value and the key module is in the shutdown state, the pre-shutdown operating state or a second operating state. It is thus possible for the first (active) operating state to be reached from all other operating states, for example, without the need for a further state transition.

By way of example, the control module may be configured to activate the first operating state if the key module is in the shutdown state and the motion of the key module is above a first wakeup limit value a single time or the motion is above a second wakeup limit value more than a predefined number of times within a wakeup period of time. By way of example, the first wakeup limit value can correspond to the motion limit value.

By way of example, the control module may be configured so as, after transmission of the shutdown request, to activate the shutdown state if the response of the key partner does not arrive within a waiting period of time. It is thus possible for the shutdown state to be activated when the key module leaves a communication range of the key partner, for example, which facilitates shutdown of the key module outside the vehicle and can increase security further.

By way of example, the communication interface may be deactivated in the shutdown state. This can reduce the power consumption of the key module. The motion sensor and the control module may at least sometimes be activated in the shutdown state. This can allow the change of operating states.

Exemplary embodiments further provide a key partner for a vehicle. The key partner comprises a communication interface, configured for radio communication with a key module for the vehicle. The key partner further comprises a control module, configured for controlling the communication interface. The control module is further configured for receiving, via the communication interface, a shutdown request of the key module. The control module is further configured for determining an authorization to shut down the key module based on whether a present state of the vehicle permits shutdown of the key module. The control module is further configured for transmitting, via the communication interface, a response to the shutdown request of the key module for the key module, wherein the response indicates whether the key partner authorizes shutdown of the key module.

Shutting down the key module allows relay attacks on the communication between key module and key partner to be hampered and increased security of the security system to be achieved, for example. The authorization of the shutdown request allows shutdown of the key module to be implemented without impairment of convenience arising after breaks in driving in which the key remains in the vehicle.

By way of example, the control module may be configured to permit shutdown of the key module if the vehicle is locked from the outside.

Exemplary embodiments further provide a method for a key module for a vehicle. The method comprises determining information about a motion of the key module. The method further comprises controlling an operating state from a plurality of operating states of the key module based on the information about the motion of the key module. The plurality of operating states comprises at least a first operating state, a pre-shutdown operating state and a shutdown state. The controlling of the operating state comprises activating the first operating state if the motion of the key module is above a motion limit value. The controlling of the operating state comprises activating the pre-shutdown operating state if the motion of the key module is below the motion limit value over a period of time. The method further comprises transmitting a shutdown request via a radio communication for the key partner of the vehicle if the key module is in the pre-shutdown operating state. The controlling of the operating state comprises shutting down the key module if a response of the key partner of the vehicle to the shutdown request indicates an authorization for the shutdown of the key module and the key module continues to be in the pre-shutdown operating state.

Exemplary embodiments further provide a method for a key partner for a vehicle. The method comprises receiving, via a radio communication, a shutdown request of the key module. The method further comprises determining an authorization to shut down the key module based on whether a present state of the vehicle permits shutdown of the key module. The method further comprises transmitting, via the radio communication, a response to the shutdown request of the key module for the key module. The response indicates whether the key partner authorizes shutdown of the key module.

Exemplary embodiments further provide a program having a program code for performing at least one of the methods when the program code is executed on a computer, a processor, a control module or a programmable hardware component.

Various exemplary embodiments will now be described more thoroughly with reference to the accompanying drawings, which depict some exemplary embodiments. In the figures, the thickness dimensions of lines, layers and/or regions may be depicted in exaggeration for the sake of clarity.

In the description of the appended figures below, which show only some exemplary embodiments by way of example, like reference symbols can denote like or comparable components. Further, combinative reference symbols can be used for components and objects that arise repeatedly in an exemplary embodiment or in a drawing, but are described together for one or more features. Components or objects that are described using like or combinative reference symbols may have single, multiple or all features, for example, their dimensionings, embodied similarly, but possibly also in different ways, unless the description explicitly or implicitly reveals otherwise.

Although exemplary embodiments can be modified and varied in different ways, exemplary embodiments are presented as examples in the figures and are described in detail herein. However, it should be clarified that the intention is not to restrict exemplary embodiments to the respectively disclosed forms, but rather that exemplary embodiments are intended to cover all of the functional and/or structural modifications, equivalents and alternatives that are within the scope of the disclosure. Like reference symbols denote like or similar elements throughout the description of the figures.

It is noted that one element denoted as "connected" or "coupled" to another element can be directly connected or coupled to the other element or that intervening elements can be present. By contrast, if one element is denoted as "directly connected" or "directly coupled" to another element, no intervening elements are present. Other terms used to describe the relationship between elements should be interpreted in a similar way (e.g., "between" vis-à-vis "directly therebetween", "adjacent" vis-à-vis "directly adjacent", etc.).

The terminology used herein serves only to describe specific exemplary embodiments and is not intended to restrict the exemplary embodiments. As used herein, the singular forms "a" and "the" are also intended to include the plural forms, unless clearly indicated otherwise by the context. Further, it should be clarified that the expressions such as, e.g., "comprises", "comprising", "has" and/or "having" as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Further, it should be clarified that expressions, e.g., those defined in generally used dictionaries, should be interpreted as if they have the meaning that is consistent with their meaning in the context of the relevant art, and should not be interpreted in an idealized or excessively formal sense, as long as this is not expressly defined herein.

Keyless entry systems in vehicles are sometimes susceptible to what are known as relay attacks, in which the distance between vehicle and radio key is bridged by two transmission/reception units so that opening and starting the vehicle is possible even if the key is actually outside the range.

Figure 4:
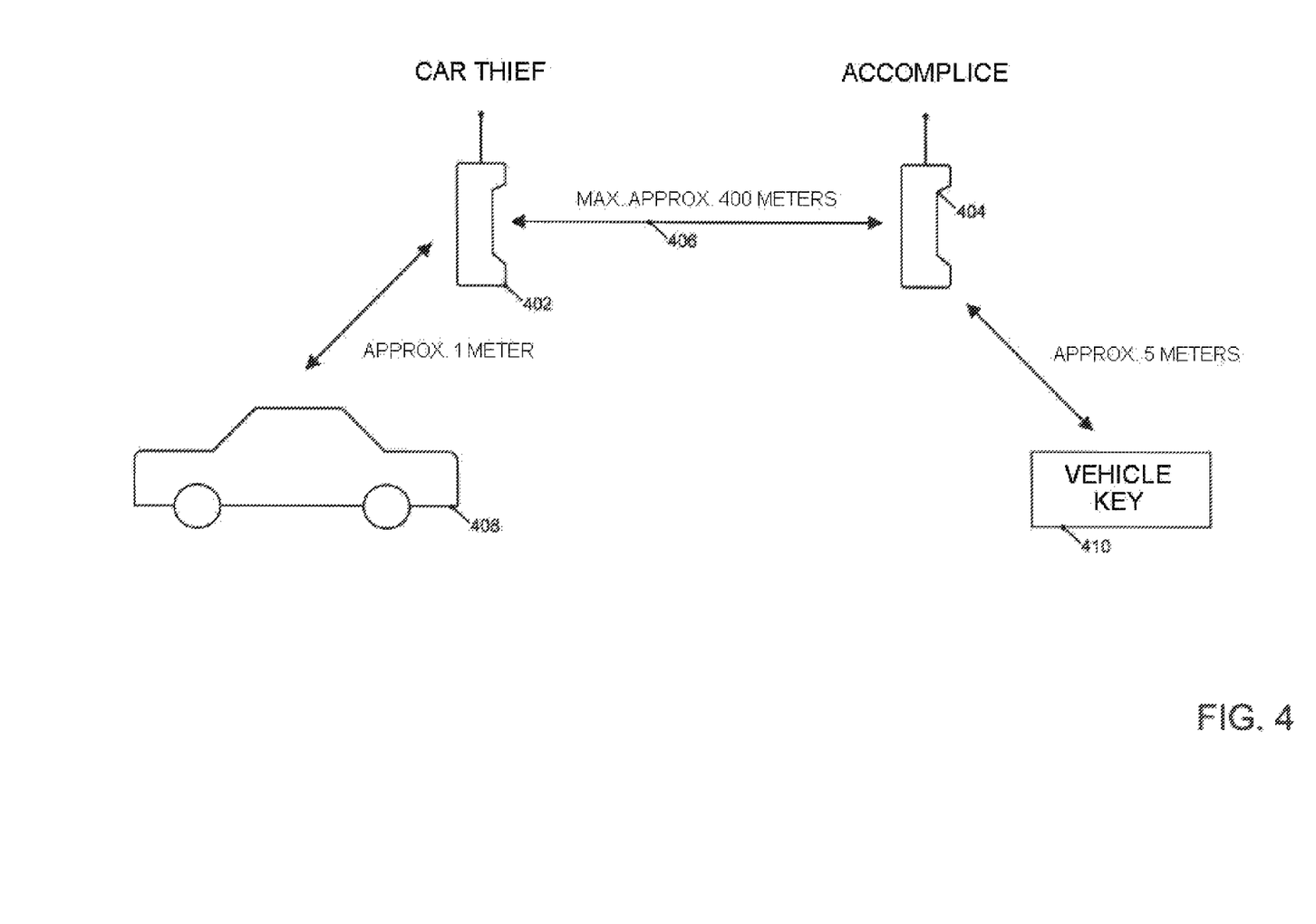
FIG. 4 shows an example of forwarding signals between a vehicle and a vehicle key by use of a radio relay.

FIG. 4 shows an example in which a car thief 402 and an accomplice 404 use a radio relay 406 to forward signals from vehicle 408 and key 410 to one another via the radio relay. It is thus possible for the car thief to possibly open and start the vehicle after a user with the key has left the vehicle.

This may be possible because vehicle entry does not require a user action on the key and it is thus possible for even the signals of a stored or pocketed key to be "relayed" for vehicle entry.

To identify or hamper relay attacks, various approaches can be chosen in some systems.
  Measures for protecting the frequency bands used for the radio communication (normally LF (Low Frequency) and UHF (Ultra High Frequency), such as, e.g., RSSI measurements (received signal strength indicator measurements), amplitude hopping
  Measures through the additional use of other frequency bands, such as, e.g., UWB (Ultra Wide Band communication) with Time-Of-Flight (ToF) measurement, phase difference measurement
  Measures in the key by which key-end shutdown of the communication takes place as soon as the key is at rest (not in motion) for some time.

Some measures against relay attacks can be complex to implement, or can be bypassed using appropriate, more complicated technology.

Measures in the key can give rise to scenarios in which the user wishes to use the key even when it is at rest, for example, in the following situations:
  Use of the keyless entry system after a relatively long break in the vehicle (e.g., with key in pocket on the front-seat passenger seat)
  Engine restart after relatively long automatic stop phase.

At least some exemplary embodiments can allow shutdown of the vehicle key without adversely affecting use of the vehicle key in these situations. Exemplary embodiments provide a method for gradual shutdown of a key for vehicle entry when the key is at rest.

Figure 1:
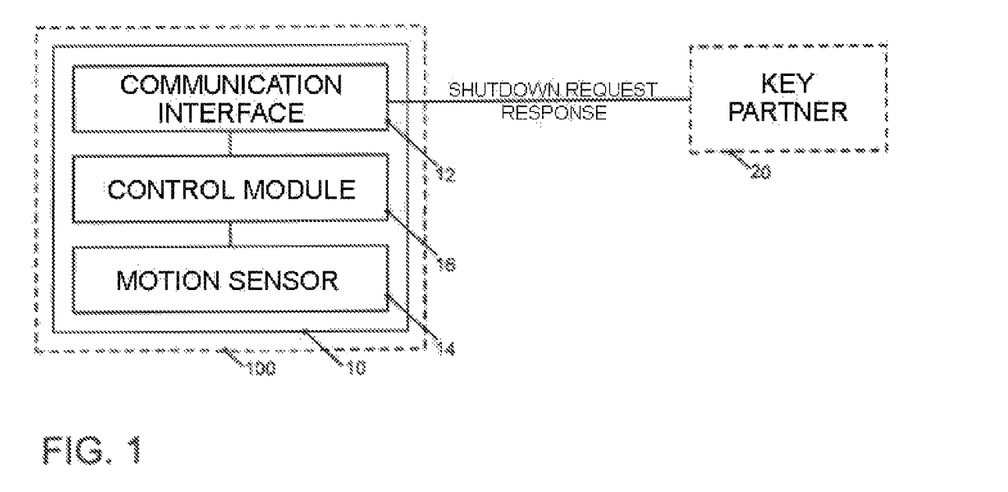
FIG. 1 shows a block diagram of an apparatus for a key module.

FIG. 1 shows a block diagram of an apparatus 10 for a key module 100 for a vehicle 200. The key module 100 can correspond to a vehicle key of the vehicle 200, for example, or a vehicle key can comprise the key module. Alternatively, a mobile device, for example, a programmable mobile phone (also called a smartphone) or a programmable watch (also called a smartwatch), can comprise the key module 100. The key module 100 can correspond to a key module for a keyless entry system and/or for a keyless go system. The key module 100 may be configured to provide a keyless entry signal and/or a keyless go signal.

The apparatus comprises a communication interface 12, configured for radio communication with a key partner 20 of the vehicle 200. By way of example, the communication interface 12 (and a communication interface 22 from FIG. 2) may be configured to communicate in the UHF (Ultra High Frequency) frequency band around 433 MHz. Alternatively or additionally, the communication interface 12; 22 may be configured to communicate in the UHF frequency band around 315 MHz. By way of example, the communication interface 12; 22 may be configured to communicate bidirectionally with the key partner 20 (or with the key module 100). Alternatively or additionally, the communication interface may be configured to communicate in a 2.4 GHz frequency band, for example, using a BLUETOOTH® protocol. By way of example, the key partner can correspond to an onboard unit (OBU) of a vehicle or may be comprised in an OBU of the vehicle. By way of example, the key partner can correspond to an entry security system of the vehicle or may be comprised in the system.

The apparatus 10 further comprises a motion sensor 14, configured for determining information about a motion of the key module 100. By way of example, the motion sensor can comprise a gyroscope or an acceleration sensor (also called an accelerometer). By way of example, the information about the motion can comprise at least one element from the group comprising information about an intensity of the motion, information about an amplitude of the motion, information about a distance of the motion, information about an acceleration of the motion, information about a duration of the motion and information about a frequency of the motion.

The apparatus 10 further comprises a control module 16, configured for controlling the communication interface 12 and the motion sensor 14.

The control module 16 is configured for controlling an operating state from a plurality of operating states of the key module 100 based on the information about the motion of the key module. By way of example, the control module 16 may be configured for activating an operating state from the plurality of operating states and/or for changing to an operating state from the plurality of operating states. The plurality of operating states comprises at least a first operating state, a pre-shutdown operating state and a shutdown state. The plurality of operating states can further comprise a second operating state. The first operating state (and the second operating state) can correspond to an active operating state, for example. By way of example, all components of the apparatus may be activated in the first operating state and in the pre-shutdown state (and in the second operating state). By way of example, the communication interface 12 may be deactivated in the shutdown state. By way of example, the motion sensor and the control module may at least sometimes be activated in the shutdown state.

By way of example, the control module 16 may be configured so as, in the first operating state and the pre-shutdown state (and the second operating state, for example), to provide a presence signal (for example, for a keyless go system or a keyless entry system) for the key partner.

The control module 16 is further configured to control the operating state by activating the first operating state if the motion (an intensity of the motion, an amplitude of the motion, an acceleration of the motion or a distance of the motion) of the key module 100 is above a motion limit value. The motion may be above a limit value (for example, the motion limit value, a further motion limit value, a first wakeup limit value and/or a second wakeup limit value) if the intensity of motion is higher than the motion limit value defines, if the motion amplitude is greater than the motion limit value defines, if the motion acceleration is greater than the motion limit value defines or if the motion distance is greater than the motion limit value defines. The motion may be below a limit value (for example, the motion limit value, a further motion limit value, a first wakeup limit value, and/or a second wakeup limit value) if the intensity of motion is lower than the motion limit value defines, if the motion amplitude is less than the motion limit value defines, if the motion acceleration is less than the motion limit value defines or if the motion distance is less than the motion limit value defines.

By way of example, the motion limit value (and a further motion limit value, a first wakeup limit value and a second wakeup limit value) can correspond to or define an intensity of motion, a motion amplitude or a motion distance. By way of example, the motion limit value may be defined on a scale, for example, as a proportion of an intensity of motion, motion amplitude, motion acceleration or motion distance defined as a maximum.

By way of example, the control module 16 may be configured to activate the first operating state if the motion of the key module 100 is above the motion limit value and the key module 100 is in the shutdown state, the pre-shutdown operating state or a second operating state. Alternatively or additionally, the control module 16 may be configured to activate the first operating state if the key module 100 is in the shutdown state and the motion of the key module 100 is above a first wakeup limit value a single time or above a second wakeup limit value more than a predefined number of times (for example, more than twice, more than four times, more than five times, more than eight times, more than ten times) within a wakeup period of time. The control module 16 may be configured to activate the first operating state if the key module 100 is in the shutdown state and the motion of the key module 100 is above the first wakeup limit value a single time. The control module 16 may be configured to activate the first operating state if the key module 100 is in the shutdown state and the motion of the key module 100 is above the second wakeup limit value more than a predefined number of times within the wakeup period of time.

The control module 16 is further configured to control the operating state by activating the pre-shutdown operating state if the motion of the key module 100 is below the motion limit value over a period of time. By way of example, the period of time can begin at an instant at which the motion is last above the motion limit value. If the period of time has elapsed without the motion being above the motion limit value, then the control module 16 may be configured to control the operating state of the key module by activating the pre-shutdown operating state. The wakeup period of time (and a further period of time) may be implemented similarly.

The control module 16 is further configured for transmitting a shutdown request via the communication interface 12 for the key partner 20 of the vehicle 100 if the key module 100 is in the pre-shutdown operating state, for example, after a change to the pre-shutdown operating state.

By way of example, the control module 16 may be configured to transmit one or more data packets with the shutdown request to the key partner 20 via the communication interface 12. By way of example, the radio communication (or data packets of the radio communication) between the key module 100 and the key partner 20 may be signed or encrypted. By way of example, the radio communication between the key module 100 and the key partner 20 may be based on a key exchange and/or on a shared key. By way of example, the key module may be coupled to the key partner with a shared key. By way of example, the control module 16 may be configured to transmit one or more signed or encrypted data packets with the shutdown request to the key partner 20 via the communication interface 12.

The control module 16 is further configured for shutting down the key module 100 if a response of the key partner 20 of the vehicle to the shutdown request indicates an authorization for the shutdown of the key module 100 and the key module 100 continues to be in the pre-shutdown operating state. By way of example, the response of the vehicle can comprise a string of bits that indicates an authorization for the shutdown (or a string of bits that indicates denial of or a ban on the shutdown). Alternatively, the response can comprise a message with a message type from a plurality of possible message types, wherein one message type from the plurality of possible message types indicates the authorization of shutdown of the key module 100 and a further message type from the plurality of possible message types indicates denial of or a ban on the shutdown.

By way of example, the control module 16 may further be configured so as, after transmission of the shutdown request, to activate the shutdown state if the response of the key partner 20 does not arrive within a waiting period of time. By way of example, the control module 16 may be configured if the response of the key partner does not arrive for longer than 5 s (or more than 10 s, more than 15 s, more than 30 s or more than 60 s).

If the response indicates denial of or a ban on the shutdown, then the control module 16 may further be configured to repeat the transmission of the shutdown request after a waiting period of time.

In at least some exemplary embodiments, the plurality of operating states can further comprise a second operating state. The control module 16 may be configured to activate the second operating state if the motion of the key module 100 is below the motion limit value over a further period of time (and the key module 100 is in the first operating state, for example). The further period of time may be longer than the period of time, for example.

The control module may further be configured to activate the pre-shutdown operating state if the motion of the key module 100 is below the motion limit value and below a further motion limit value over the period of time and the key module 100 is in the second operating state. By way of example, the motion limit value can permit a higher intensity of motion (or a greater motion amplitude, or a greater motion distance or a greater motion acceleration) than the further motion limit value.

By way of example, the control module 16 may be configured to activate the first operating state, from the shutdown state or the pre-shutdown state, if the motion of the key module 100 is above the motion limit value and to activate the second operating state if the motion of the key module 100 is between the motion limit value and the further motion limit value.

By way of example, the radio interface 12 (and a radio interface 22 from FIG. 2) can correspond to one or more inputs and/or one or more outputs for receiving and/or transmitting information, for example, in digital bit values, based on a code, within a module, between modules, or between modules of different entities. In exemplary embodiments the control module 16 (and a control module 24 from FIG. 2) can correspond to an arbitrary controller or processor or to a programmable hardware component. By way of example, the control module 16; 24 may also be implemented as software that is programmed for an appropriate hardware component. In this respect, the control module 16; 24 may be implemented as programmable hardware with appropriately adapted software. In this case, arbitrary processors, such as digital signal processors (DSPs), can be used. Exemplary embodiments are not limited to one type of processor in this case. Arbitrary processors or else multiple processors are conceivable for implementing the control module 16; 24.

In at least some exemplary embodiments, the vehicle 200 can correspond to a land vehicle, a watercraft, an aircraft, a rail vehicle, a road vehicle, an automobile, an all-terrain vehicle, a motor vehicle or a truck, for example.

Exemplary embodiments further provide the key module 100 comprising the apparatus 10 for the key module 100. The control module 16 is coupled to the motion sensor 14 and the communication interface 12.

Figure 1A:
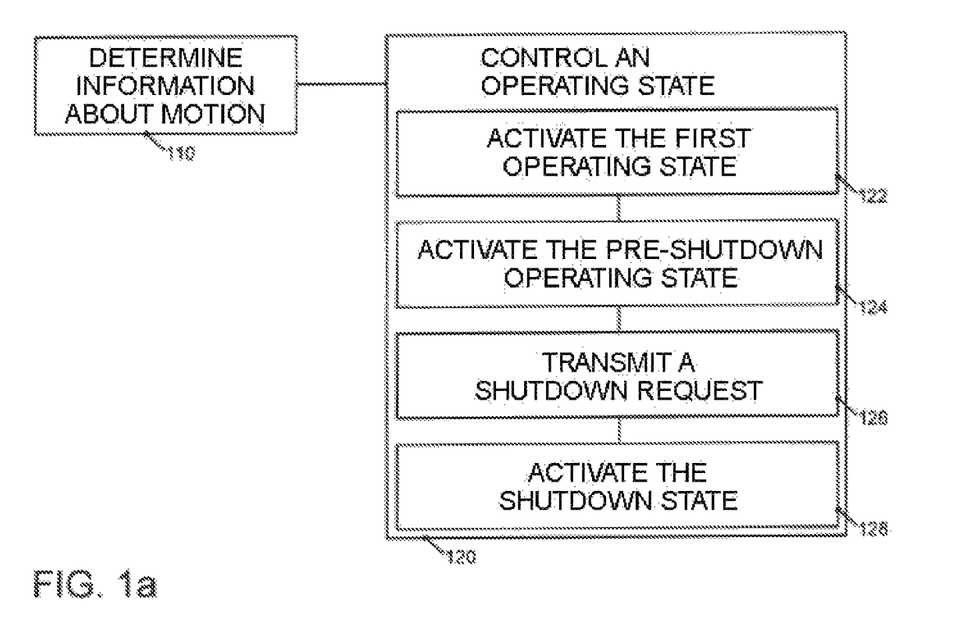
FIG. 1a shows a flowchart for a method for a key module.

FIG. 1a shows a flowchart for an applicable method for a key module 100 for a vehicle 200. The method comprises determining 110 information about a motion of the key module 100. The method further comprises controlling 120 an operating state from a plurality of operating states of the key module 100 based on the information about the motion of key module. The plurality of operating states comprises at least a first operating state, a pre-shutdown operating state and a shutdown state. The controlling 120 of the operating state comprises activating 122 the first operating state if the motion of the key module 100 is above a motion limit value. The controlling 120 of the operating state further comprises activating 124 the pre-shutdown operating state if the motion of the key module 100 is below the motion limit value over a period of time. The method (or the controlling 120 of the operating state) further comprises transmitting 126 a shutdown request via a radio communication for the key partner 20 of the vehicle 200 if the key module 100 is in the pre-shutdown operating state. The controlling 120 of the operating state further comprises shutting down 128 the key module 100 if a response of the key partner 20 of the vehicle to the shutdown request indicates an authorization for the shutdown of the key module 100 and the key module 100 continues to be in the pre-shutdown operating state.

More details of the method are cited in conjunction with the design or examples that have been described earlier (e.g., FIG. 1). The method can comprise one or more additional optional features that correspond to one or more embodiments of the proposed design or of the described examples, as have been described earlier or later.

Figure 2:
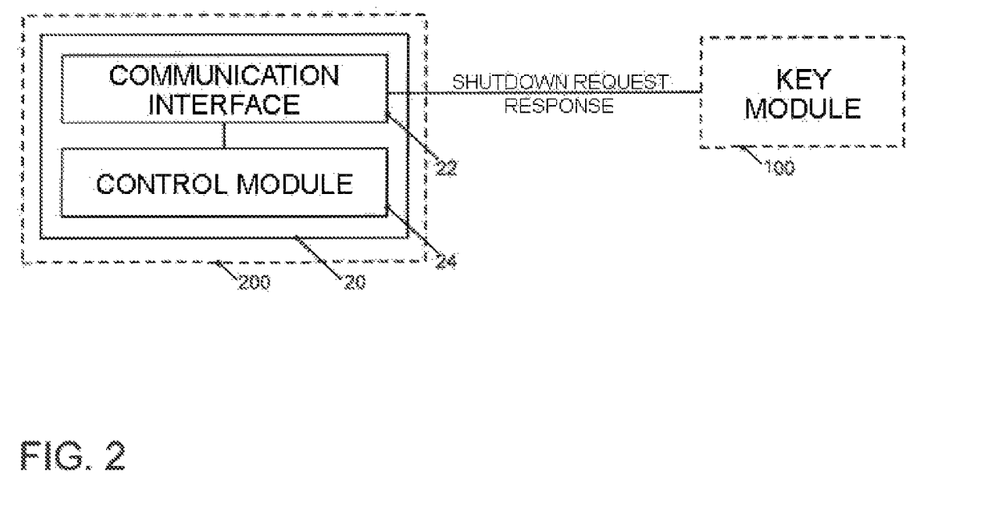
FIG. 2 shows a block diagram of a key partner.

FIG. 2 shows a block diagram of a key partner 20 for a vehicle 200. The key partner comprises a communication interface 22, configured for radio communication with a key module 100 for the vehicle 200. The key partner further comprises a control module 24, configured for controlling the communication interface 22.

The control module 24 is configured for receiving, via the communication interface 22, a shutdown request of the key module 100, for example, as one or more encrypted data packets.

The control module 24 is further configured for determining an authorization for the shutdown of the key module 100 based on whether a present state of the vehicle 200 permits shutdown of the key module 100. By way of example, the control module 24 may be configured to permit shutdown of the key module 100 if the vehicle is locked from the outside, for example, if locking of the vehicle has been activated by the key module 100 or a further key module (from the outside). Additionally or alternatively, the control module 24 may be configured to permit shutdown of the key module 100 if an instant at which an engine of the vehicle 200 has been deactivated is longer ago than a predefined engine off-time period of time, for example, longer than 15 minutes (or longer than 30 minutes, longer than one hour, longer than two hours).

The control module 24 is further configured for transmitting, via the communication interface 22, a response to the shutdown request of the key module 100 for the key module 100. The response indicates whether the key partner 20 authorizes shutdown of the key module 100.

More details of the key partner are cited in conjunction with the design or examples that have been described earlier (e.g., FIGS. 1 and 1a). The key partner can comprise one or more additional optional features that correspond to one or more embodiments of the proposed design or of the described examples, as have been described earlier or later.

Figure 2A:
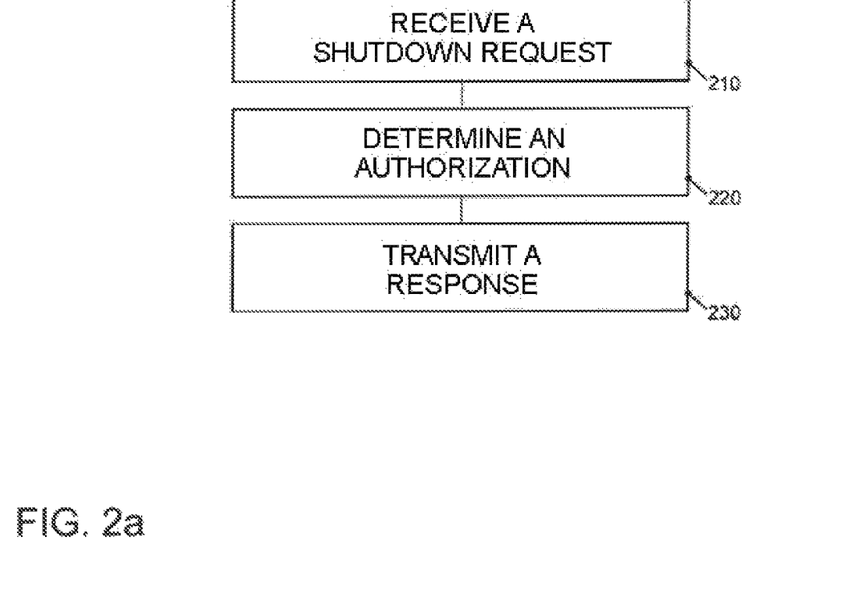
FIG. 2a shows a flowchart for a method for a key partner.

FIG. 2a shows a flowchart for a method for a key partner 20 for a vehicle 200. The method comprises receiving 210, via a radio communication, a shutdown request of the key module 100. The method further comprises determining 220 an authorization to shut down the key module 100 based on whether a present state of the vehicle 200 permits shutdown of the key module 100. The method further comprises transmitting 230, via the radio communication, a response to the shutdown request of the key module 100 for the key module 100. The response indicates whether the key partner 20 authorizes shutdown of the key module 100.

More details of the method are cited in conjunction with the design or examples that have been described earlier (e.g., FIGS. 1 to 2). The method can comprise one or more additional optional features that correspond to one or more embodiments of the proposed design or of the described examples, as have been described earlier or later.

Exemplary embodiments provide a multistage method for shutting down a key that is part of a keyless entry system using the data of a motion/acceleration sensor installed in the key and having regard to the vehicle status.

Figure 3:
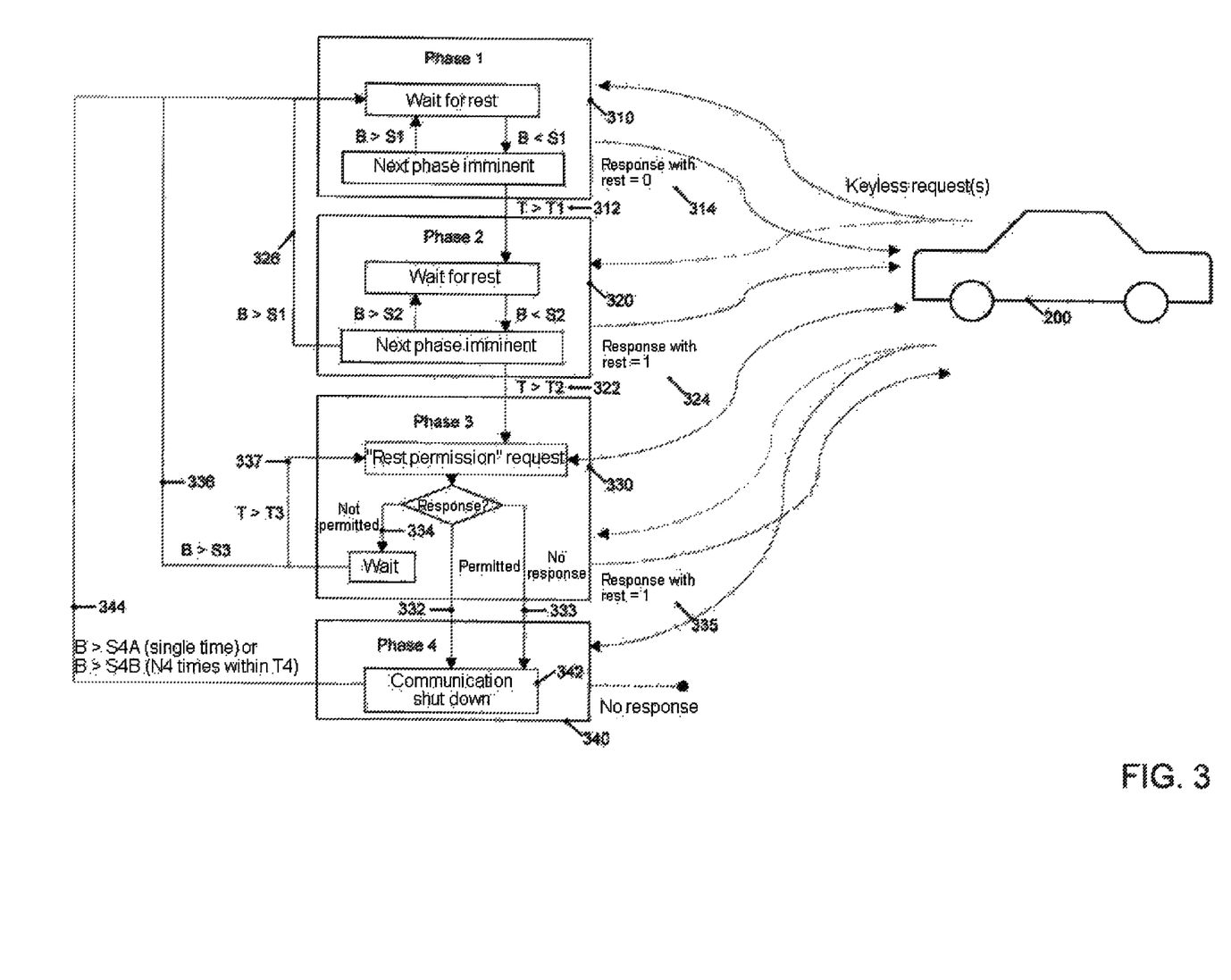
FIG. 3 shows a flowchart for an exemplary sequence in a multistage method for shutting down a key that is part of a keyless entry system.

FIG. 3 shows a flowchart for an exemplary sequence in the multistage method:

In a first phase 310 (the first operating state), the key can have a high sensitivity for the identification of movements. If the identified movements/accelerations B (for example, the motion of the key module 100) remain below the threshold S1 (for example, the motion limit value) defined for this phase for a defined time T1 (for example, the period of time), then the key can change 312 to phase 2 320 (to the second operating state).

Within phase 1 310, the key can respond 314 to communication requests normally by transmitting an activity status (rest bit=0). The vehicle 200 can thus be informed that the key is not (yet) at rest.

In the second phase 320, the key can have a lower sensitivity for the identification of movements. If the identified movements/accelerations B remain below the threshold S2 (S2<S1) (for example, the further motion limit value) defined for this phase for a defined time T2 (for example, the further period of time), then the key can change 322 to phase 3 330.

Within phase 2, the key can respond 324 to communication requests further by transmitting a rest status (rest bit=1). The vehicle can thus be informed that the key will change to rest or shutdown in the near future, for example.

If a motion/acceleration B above the defined threshold S1 is detected at an (arbitrary) instant in phase 2, then the key can change 326 back to phase 1.

On reaching the third phase 330 (for example, the pre-shutdown operating state), the key can actively send a request to the vehicle (for example, the shutdown request) concerning whether a change to phase 4 340 (shutdown, for example, the shutdown state) is admissible. The vehicle may consequently be able to prevent the change to phase 4 340 and hence shutdown of the key. By way of example, the vehicle can permit shutdown (only) if it is locked from the outside.

The vehicle can then (only) change to phase 4 340 if the vehicle has granted 332 permission for shutdown or the key has not received 333 a response within a timeout time (and may accordingly be outside the range of the vehicle, for example).

An engine start may be possible when the vehicle is unlocked or is locked from the inside, for example, even with the key at rest.

If the key (the key module) does not receive permission for shutdown (negative response of the vehicle 334), then it can remain in phase 3 330 and, on requests from the vehicle, can continue to send the rest status (rest bit=1) 335 as well. The rest request on the vehicle can be repeated 337 after a time T3.

If a motion/acceleration B above a defined threshold S3 (for example, the motion limit value or another motion limit value) is detected at an (arbitrary) instant in phase 3, then the key can change 336 back to phase 1.

In phase 4 340, the key can shut down 342 (completely) apart from motion identification/acceleration identification. Use of the key or communication with the vehicle may not be possible in this state.

The key can change 344 back to the normal state (=phase 1) (only) if a single motion/acceleration B above a threshold S4A (for example, the first wakeup limit value) defined for this phase has been detected or if a defined number N4 of transgressions of a second threshold S4B (for example, the second wakeup limit value) have been detected within a defined time T4 (for example, the wakeup period of time).

In at least some exemplary embodiments, shutdown of the key can be effected in multiple stages. The shutdown can be effected (only) after prior "permission" from the vehicle (query with the vehicle) or outside the range of radio communication of the vehicle, for example. The vehicle may thus have the option, depending on its own state, of preventing key shutdown to be able to continue to provide the user with the desired convenience.

The individual method parts described (multistage embodiment, query with the vehicle) can also be used individually and independently of one another. The combination of the two method parts can increase the robustness of the system and provide more optimization options. By way of example, the following restrictions/changes can be made:

By way of example, the second phase can be omitted in some cases, i.e., after rest in accordance with phase 1 the key changes directly to phase 3 and requests shutdown from the vehicle.

In some exemplary embodiments, (only) one of the two conditions described can wake the key in phase 4. In some exemplary embodiments, thresholds can match thresholds/limit values, e.g., it is possible for threshold S2=S3. In some exemplary embodiments, a return can be made from phase 3 and 4 to phase 2 instead of phase 1, for example, as a differentiated return from phase 3 or 4 to phase 1 or 2 on the basis of different thresholds.

In at least some exemplary embodiments, the user may be able to use the key if, although it is at rest, it is still in range of the vehicle, e.g., after a relatively long break in the vehicle. Nevertheless, a relay attack, with the key at rest for a relatively long time (e.g., at home in the key box), can be prevented at the same time.

More details are cited in conjunction with the design or examples that have been described earlier (e.g., FIGS. 1 to 2a). Exemplary embodiments can comprise one or more additional optional features that correspond to one or more embodiments of the proposed design or of the described examples, as have been described earlier or later.

A further exemplary embodiment is a computer program for performing at least one of the methods described above when the computer program runs on a computer, a processor or a programmable hardware component. A further exemplary embodiment is also a digital storage medium that is machine-readable or computer-readable and that has electronically readable control signals that can interact with a programmable hardware component such that one of the methods described above is carried out.

The features disclosed in the description above, the claims below and the appended figures may be of importance, and can be implemented, both individually and in any combination for the realization of an exemplary embodiment in its various configurations.

Although some embodiments have been described in connection with an apparatus, it goes without saying that these embodiments also represent a description of the corresponding method, so that a block or a component of an apparatus should also be understood as a corresponding method operation or as a feature of a method operation. Analogously to this, embodiments described in connection with or as a method operation also represent a description of a corresponding block or detail or feature of a corresponding apparatus.

Depending on implementation requirements, exemplary embodiments can be implemented in hardware or in software. The implementation can be performed using a digital storage medium, for example, a floppy disk, a DVD, a Blu-ray Disc, a CD, a ROM, a PROM, an EPROM, an EEPROM or a FLASH memory, a hard disk or another magnetic or optical memory that stores electronically readable control signals that can interact or do interact with a programmable hardware component such that the respective method is performed.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system on chip (SOC), a programmable logic element or a field programmable gate array (FPGA) with a microprocessor.

The digital storage medium may therefore be machine-readable or computer-readable. Some exemplary embodiments thus comprise a data medium that has electronically readable control signals that are capable of interacting with a programmable computer system or a programmable hardware component such that one of the methods described herein is performed. At least one exemplary embodiment is therefore a data medium (or a digital storage medium or a computer-readable medium) on which the program for performing one of the methods described herein is recorded.

Generally, exemplary embodiments may be implemented as a program, firmware, computer program or computer program product having a program code or as data, wherein the program code or the data is or are operative to the effect of performing one of the methods when the program runs on a processor or a programmable hardware component. The program code or the data may, by way of example, also be stored on a machine-readable medium or data medium. The program code or the data can be present inter alia as source code, machine code or byte code and as other intermediate code.

A further exemplary embodiment is further a data stream, a signal train or a sequence of signals that represents or represent the program for performing one of the methods described herein. The data stream, the signal train or the sequence of signals may be configured, by way of example, to the effect of being transferred via a data communication link, for example, via the Internet or another network. Exemplary embodiments are thus also data-representing signal trains that are suitable for sending via a network or a data communication link, wherein the data represent the program.

A program according to at least one exemplary embodiment can implement one of the methods while it is being performed, for example, by reading memory locations or writing a datum or multiple data thereto, as a result of which, if need be, switching processes or other processes are brought about in transistor structures, in amplifier structures or in other electrical components, optical components, magnetic components or components operating according to another functional principle. Accordingly, by virtue of a memory location being read, it is possible for data, values, sensor values or other information to be captured, determined or measured by a program. A program can therefore capture, determine or measure variables, values, measured variables and other information by reading one or more memory locations, and can bring about, prompt or perform an action, and actuate other devices, machines and components, by writing to one or more memory locations.

The exemplary embodiments described above are merely an illustration of the principles of the present disclosure. It goes without saying that modifications and variations of the arrangements and details described herein will become apparent to other persons skilled in the art. Therefore, the intention is for the disclosure to be restricted only by the scope of protection of the patent claims below, and not by the specific details that have been presented herein on the basis of the description and the explanation of the exemplary embodiments.

LIST OF REFERENCE SYMBOLS

10 Apparatus for a key module
12 Communication interface
14 Motion sensor
16 Control module
20 Key partner
22 Communication interface
24 Control module
100 Key module
200 Vehicle
310 First phase
312 Change operating state to second phase
314 Transmission of an activity status
320 Second phase
322 Change operating state to third phase
324 Transmission of an activity status
326 Change back to first phase
330 Third phase
332 Permission granted
333 No response received within timeout time
334 Negative response of the vehicle
335 Transmission of an activity status
336 Change back to first phase
337 Repeat rest request
340 Fourth phase
342 Shutdown
344 Change back to first phase
402 Car thief
404 Accomplice
406 Radio relay
408 Vehicle
410 Key

The invention claimed is:

1. An apparatus for a key module for a transportation vehicle, the apparatus comprising:
a communication interface for radio communication with a key partner of the transportation vehicle;
a motion sensor for determining information about a key module motion; and
a control module for:
controlling the communication interface and the motion sensor,
controlling an operating state included in a plurality of operating states of the key module based on the determined information about the key module motion,
wherein the plurality of operating states comprises at least a first operating state, a pre-shutdown operating state and a shutdown state, by:
activating the first operating state in response to the key module motion being above a motion limit value,
activating the pre-shutdown operating state in response to the key module motion being below the motion limit value over a period of time,
transmitting a shutdown request via the communication interface for the key partner of the transportation vehicle in response to the key module being in the pre-shutdown operating state, and
shutting down the key module in response to a response of the key partner of the transportation vehicle to the shutdown request indicating an authorization for shutdown of the key module while the key module continues to be in the pre-shutdown operating state.

2. The apparatus of claim 1, wherein the plurality of operating states further comprises a second operating state, wherein the control module activates the second operating state in response to the key module motion being below the motion limit value over a further period of time, and wherein the control module activates the pre-shutdown operating state in response to the key module motion being below the motion limit value and below a further motion limit value over the period of time while the key module is in the second operating state.

3. The apparatus of claim 2, wherein the control module activates the second operating state in response to the key module motion being below the motion limit value over the further period of time and the key module being in the first operating state, and/or
the control module activates the first operating state, from the shutdown state or the pre-shutdown state, in response to the key module motion being above the motion limit value and activates the second operating state in response to the key module motion being between the motion limit value and the further motion limit value, and/or
the motion limit value permits a higher intensity of motion than the further motion limit value, and/or
the plurality of operating states further comprises one or more intermediate operating states between the second operating state and the pre-shutdown operating state.

4. The apparatus of claim 1, wherein the control module activates the first operating state in response to:
the key module motion being above the motion limit value and the key module being in the shutdown state, the pre-shutdown operating state or a second operating state, or
the control module activates the first operating state in response to the key module being in the shutdown state and the key module motion being above a first wakeup limit value a single time or being above a second wakeup limit value more than a predefined number of times within a wakeup period of time,
and/or the control module, after transmission of the shutdown request, activates the shutdown state in response to the response of the key partner of the transportation vehicle not arriving within a waiting period of time.

5. The apparatus of claim 1, wherein the communication interface is deactivated in the shutdown state, and/or the motion sensor and the control module are at least sometimes activated in the shutdown state.

6. A key partner for a transportation vehicle, the key partner comprising:
a communication interface for radio communication with a key module for the transportation vehicle; and
a control module for:
controlling the communication interface,
receiving, via the communication interface, a shutdown request of the key module,
determining an authorization to shut down the key module based on whether a present state of the transportation vehicle permits shutdown of the key module, and
transmitting, via the communication interface, a response to the shutdown request of the key module for the key module, wherein the response indicates whether the key partner authorizes the shutdown of the key module.

7. The key partner of claim 6, wherein the control module permits shutdown of the key module in response to the transportation vehicle being locked from the outside.

8. A method for a key module for a transportation vehicle, the method comprising:
determining information about a key module motion; and
controlling an operating state from a plurality of operating states of the key module based on the information about the key module motion, wherein the plurality of operating states comprises at least a first operating state, a pre-shutdown operating state and a shutdown state, by:
activating the first operating state in response to the key module motion being above a motion limit value,
activating the pre-shutdown operating state in response to the key module motion being below the motion limit value over a period of time,
transmitting a shutdown request via a radio communication to a key partner of the transportation vehicle in response to the key module being in the pre-shutdown operating state, and
shutting down the key module, in response to a response of the key partner of the transportation vehicle to the shutdown request indicating an authorization for shutdown of the key module while the key module continues to be in the pre-shutdown operating state.

9. A method for a key partner for a transportation vehicle, the method comprising:
receiving, via a radio communication, a shutdown request of the key module;
determining an authorization to shut down the key module based on whether a present state of the transportation vehicle permits shutdown of the key module; and
transmitting, via the radio communication, a response to the shutdown request of the key module for the key module, wherein the response indicates whether the key partner of the transportation vehicle authorizes the shutdown of the key module.

10. A non-transitory computer readable medium including a program having a program code for performing a method for a key module for a transportation vehicle, when the program code is executed on a computer, a processor, a control module or a programmable hardware component the method comprising:
determining information about a key module motion; and
controlling an operating state from a plurality of operating states of the key module based on the information about the key module motion,
wherein the plurality of operating states comprises at least a first operating state, a pre-shutdown operating state and a shutdown state, by:
activating the first operating state in response to the key module motion le being above a motion limit value,
activating the pre-shutdown operating state in response to the motion of the key module motion being below the motion limit value over a period of time,
transmitting a shutdown request via a radio communication to a key partner of the transportation vehicle in response to the key module being in the pre-shutdown operating state, and
shutting down the key module, in response to a response of the key partner of the transportation vehicle to the shutdown request indicating an authorization for shutdown of the key module while the key module continues to be in the pre-shutdown operating state.

11. A non-transitory computer readable medium including a computer program having a program code for performing a method for a key partner for a transportation vehicle, when the program code is executed on a computer, a processor, a control module or a programmable hardware component the method comprising:
- receiving, via a radio communication, a shutdown request of the key module;
- determining an authorization to shut down the key module based on whether a present state of the transportation vehicle permits shutdown of the key module; and
- transmitting, via the radio communication, a response to the shutdown request of the key module for the key module, wherein the response indicates whether the key partner for the transportation vehicle authorizes the shutdown of the key module.

* * * * *